United States Patent [19]
Link et al.

[11] Patent Number: 5,609,446
[45] Date of Patent: Mar. 11, 1997

[54] COMBINATION TOOL

[75] Inventors: Hans-Jörg Link, Stuttgart; Werner Schurer, Schönaich, both of Germany

[73] Assignee: Joh. & Ernst Link GmbH & Co. KG, Stuttgart, Germany

[21] Appl. No.: 490,937

[22] Filed: Jun. 16, 1995

[30] Foreign Application Priority Data

Jun. 17, 1994 [DE] Germany .................... 44 21 002.7

[51] Int. Cl.⁶ .................................................. B23B 51/10
[52] U.S. Cl. .................. 408/224; 279/46.3; 279/4.03; 279/53; 408/190
[58] Field of Search ................ 279/46.2, 46.3, 279/158, 4.03, 53; 408/224, 225, 189–193

[56] References Cited

U.S. PATENT DOCUMENTS

| | | | |
|---|---|---|---|
| 716,177 | 12/1902 | Bell | 408/193 |
| 745,048 | 11/1903 | Fuhrer | 408/224 |
| 1,229,565 | 6/1917 | Ahlgren | 408/224 |
| 2,154,560 | 4/1939 | Bonham | 408/192 |
| 2,567,471 | 9/1951 | Collgert et al. | 279/4.03 |
| 5,071,295 | 12/1991 | Greig | 408/225 |
| 5,265,988 | 11/1993 | Schmigalla et al. | 408/225 |

FOREIGN PATENT DOCUMENTS

| | | | |
|---|---|---|---|
| 2369775 | 6/1978 | France | 408/191 |
| 94025210 | 11/1994 | WIPO | 408/225 |

*Primary Examiner*—Steven C. Bishop
*Attorney, Agent, or Firm*—Robert W. Becker & Associates

[57] ABSTRACT

A combination tool has a tool holding fixture for connecting the combination tool to a drive spindle of a machine tool. The tool holding fixture includes a receiving member. A grip with tensioning sleeve is provided. The grip is received in the receiving member of the tool holding fixture and clamped with the tensioning sleeve within the receiving member. The grip has a receiving element for receiving a shank of a working tool and an end face facing away from the holding fixture. At least one cutting member is connected to the end face of the grip.

13 Claims, 6 Drawing Sheets

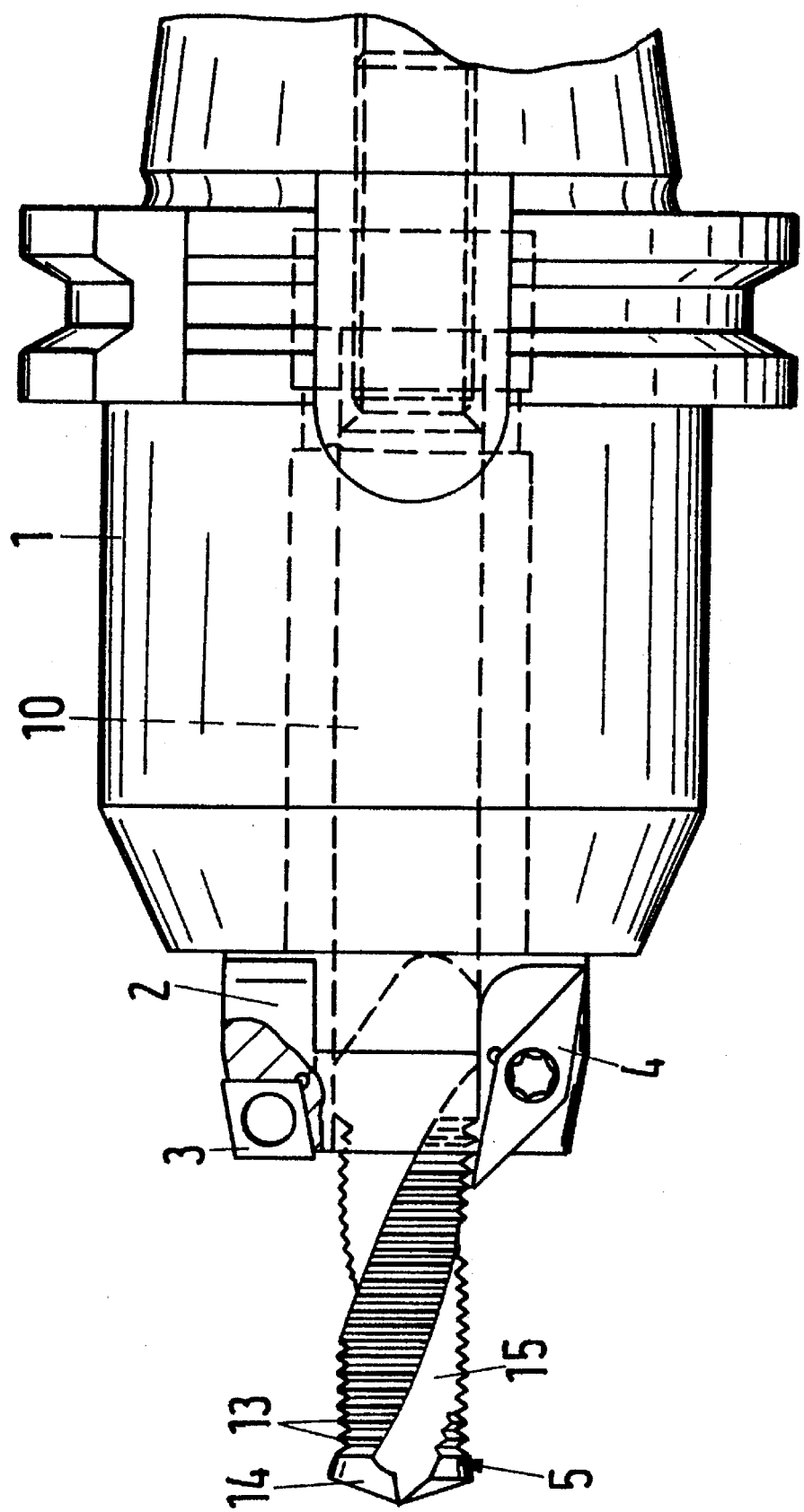

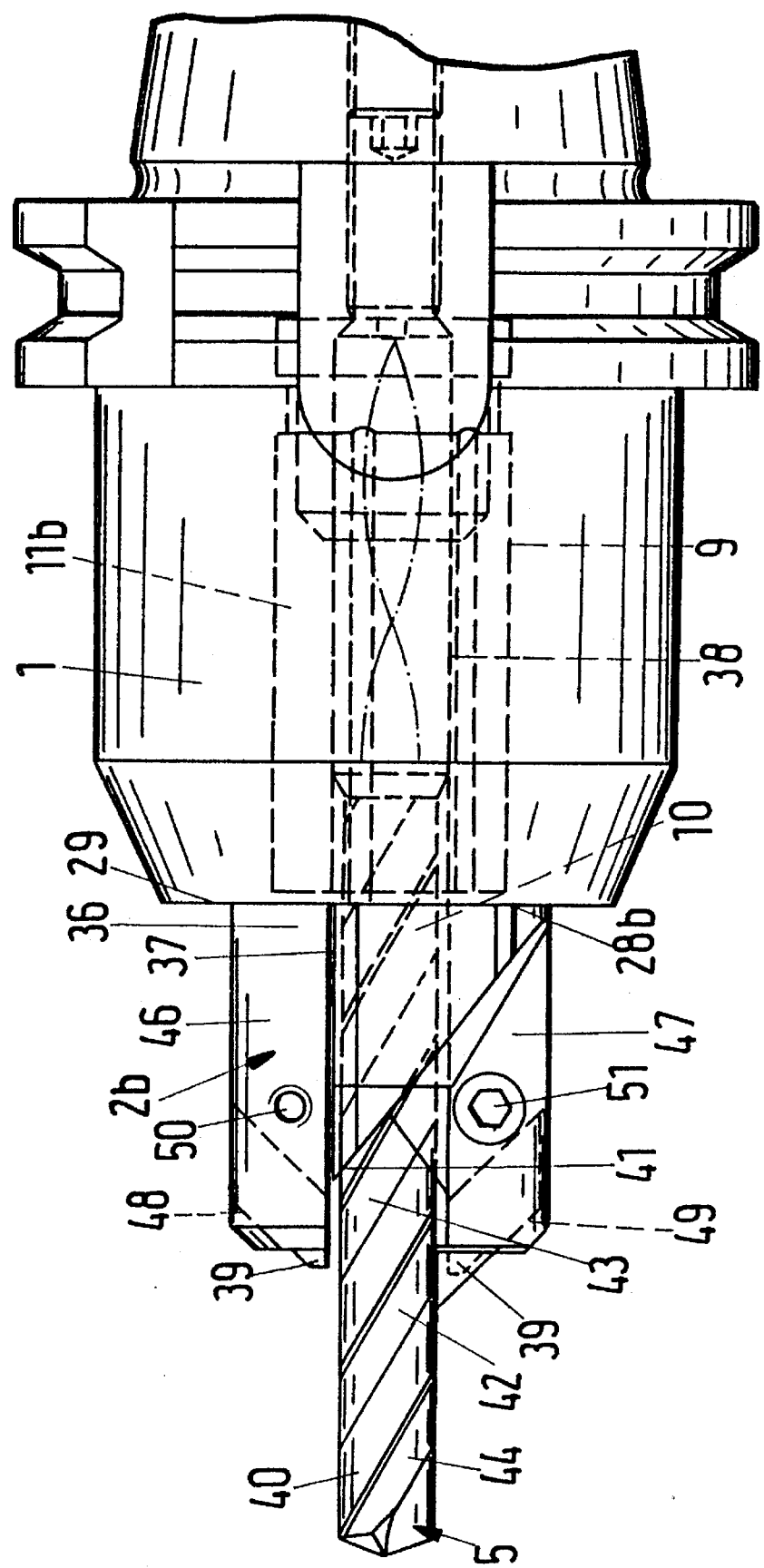

COMBINATION TOOL

BACKGROUND OF THE INVENTION

The present invention relates to a combination tool provided with a tool holding fixture that is connected with the driving spindle of a machine tool. The tool holding fixture has a receiving element for a grip that can be clamped with a tension sleeve in the tool holding fixture. The grip receives the shank of a tool. The combination tool comprises at least one cutting member.

The tool holding fixture of the known combination tool is connected to the drive spindle of the processing machine. Into the tool holding fixture, the grip with a tension sleeve is inserted which is being clamped hydraulically within the tool holding fixture. The shank of the working tool with which a work piece is to be processed, rests in the tension sleeve. This working tool is a special tool since it is additionally provided with at least one cutting member, for example, a chamfering plate. The tool can, for example, be a twist drill with which a drill hole is made in the work piece. Subsequent to the drilling process, a chamfering process can be carried out with the cutting member which is fixedly connected to the twist drill. In case that a deeper drill hole has to be made in the work piece, this special tool cannot be employed since the drill length is defined by the distance between the drill tip and the cutting member. Therefore, in this case, a different special tool has to be employed with which the drill length projecting past the cutting member is correspondingly longer. For this reason, a large number of special tools have to be manufactured and kept in stock. This is expensive for the user of the combination tool.

It is, therefore, an object of the invention to improve the design of the aforementioned combination tool such that very different machining processes can be carried out cost-efficiently at a work piece.

SUMMARY OF THE INVENTION

A combination tool according to the present invention is primarily characterized by:

- a tool holding fixture for connecting the combination tool to a drive spindle of a machine tool;
- the tool holding fixture comprising a receiving member;
- a grip with tensioning sleeve, the grip received in the receiving member of the tool holding fixture and clamped with the tensioning sleeve within the receiving member;
- the grip having a receiving element for receiving a shank of a working tool and an end face facing away from the holding fixture; and
- at least one cutting member connected to the end face of the grip.

The grip preferably comprises clamping elements distributed at a distance from one another about in a circumferential direction of the grip, wherein each one of the cutting members is connected to a separate one of the clamping elements.

Expediently, he clamping elements each have a lateral surface facing a neighboring one of the clamping elements and wherein the cutting members are connected to the lateral surface.

The lateral surface comprises a receiving element for the cutting member.

Preferably, the grip comprises at least one receiving portion for the at least one cutting member, the at least one receiving portion extending slanted to an axis of the working tool.

Advantageously, the combination tool further comprises a clamping leg for clamping the at least one cutting member in the receiving portion.

The working tool is continuously (as opposed to "stepwise") axially displaceable and adjustable relative to the at least one cutting member.

The tensioning sleeve hydraulically clamps the grip in the tool holding device.

The combination tool further comprises a draw-in collet for clamping the working tool in the grip.

The grip preferably comprises clamping elements distributed at a distance from one another about the circumference of the grip, wherein only one of the cutting members is provided and connected to one of the clamping elements.

The one clamping element has a lateral surface facing a neighboring one of the clamping elements and wherein the cutting member is connected to the lateral surface. Preferably, the lateral surface comprises a receiving element for the cutting member.

With the inventive combination tool, the cutting member is not provided at the working tool but at the grip. Therefore, most diverse working tools can be inserted into the grip, according to the desired process. These working tools may have a conventional design so that standard tools can be used with the inventive combination tool. Most diverse standard tools can be inserted into the grip such as twist drills, thread taps, thread tap drills and the like. These tools can be adjusted axially relative to the grip in order to produce drill holes of different lengths in the work piece. The cutting member can be attached to the grip in a simple manner and be replaced, if necessary. Most diverse cutting members can be applied, for example, chamfering plates, facing plates (for transverse turning) and the like. For carrying out the various processes, the user of the inventive combination tool, therefore, only has to provide a grip into which he can insert the standard tool, according to the desired kind of process.

BRIEF DESCRIPTION OF THE DRAWINGS

The objects and advantages of the present invention will appear more clearly from the following specification in conjunction with the accompanying schematic drawings, in which:

FIG. 2 and FIG. 3 illustrate side views of further embodiments of inventive combination tools according to FIG. 1;

FIG. 8 illustrates a side view of a further embodiment of an inventive combination tool.

DESCRIPTION OF PREFERRED EMBODIMENTS

Figure 1:
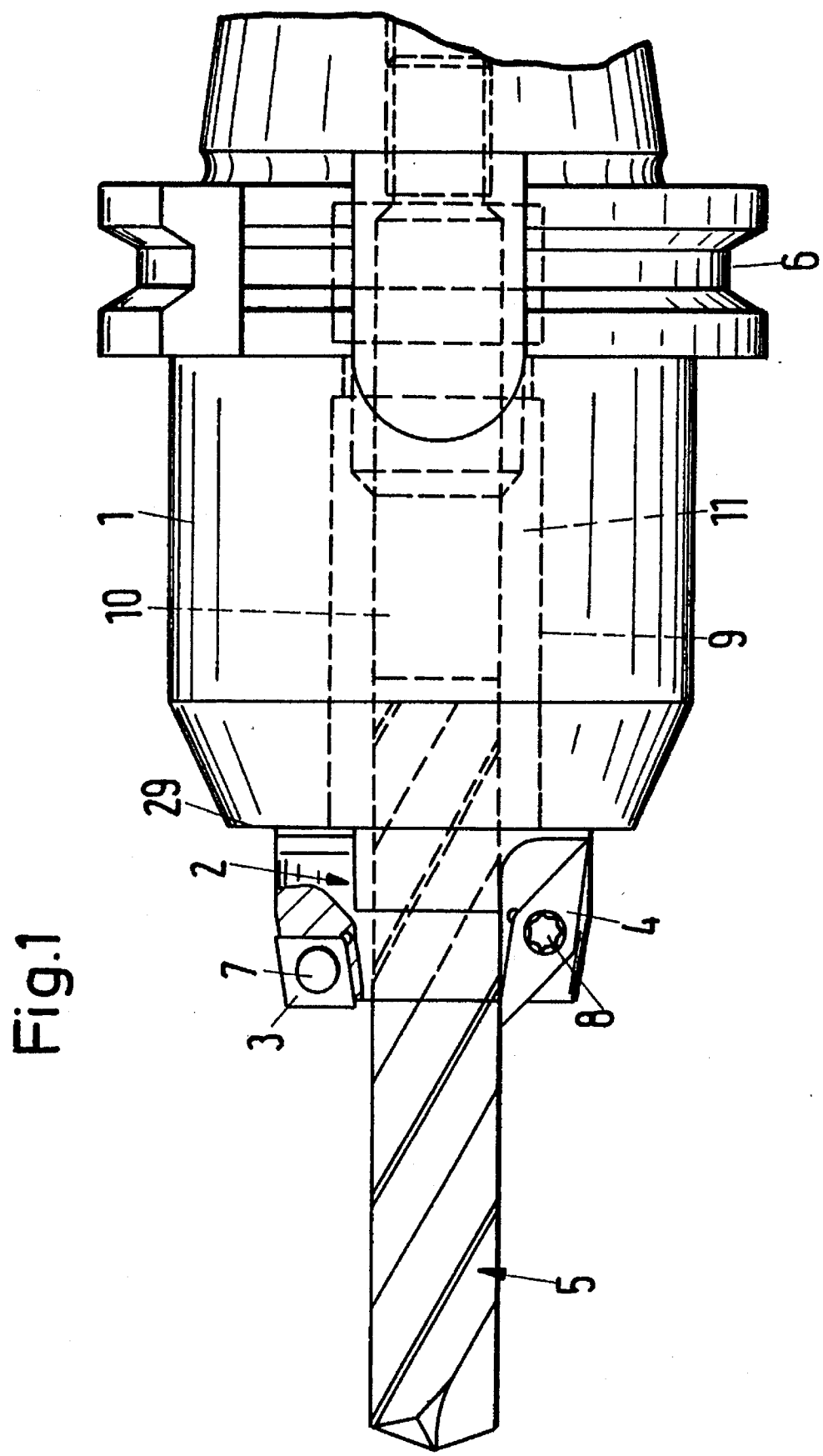
FIG. 1 illustrates a side view of an inventive combination tool.

The combination tool according to FIG. 1 is provided with a tool holding fixture 1 that is known per se. By means of this tool holding fixture 1, the combination tool is connected to a spindle of a machine tool in a manner known per se. The tool holding fixture 1 is provided with an attachment groove 6 so that the combination tool can be engaged by a gripping system of the machine tool for the tool exchange. Since the tool holding fixture 1 with the attachment groove 6 is known, it is not described in detail.

The tool holding fixture 1 comprises a hydro-clamping bushing 9 (receiving member) by which the grip 2 is tightened hydraulically. The grip 2 receives a working tool 5 which is a twist drill in the embodiment according to FIG. 1. In this embodiment, the grip 2 is provided with a facing plate 3 and a chamfering plate 4. These two cutting plates 3, 4 are advantageously designed as indexable inserts which are removably attached to the grip 2 by screws 7, 8.

The hydro-clamping bushing 9 (receiving member) of the tool holding fixture 1 is designed as known per se. The hydro-clamping bushing 9 receives a tension sleeve 11 of the grip 2. The shank 10 of the twist drill is inserted into the tension sleeve 11. The tension sleeve 11 abuts the interior wall of the hydro-clamping bushing 9 of the tool holding fixture 1. The inner wall of the hydro clamping bushing 9 is elastically expandable radially inwardly by an hydraulic medium. Thus, the tension sleeve 11 of the grip 2 is clamped highly accurately within the hydro-clamping bushing 9 of the tool holding fixture. Thus, the shank 10 of the twist drill bit 5 is also tightened highly accurately.

With this combination tool, several machining steps at one work piece can be carried out in one single process. With the twist drill 5 axially projecting past the grip 2, a drill hole is first drilled into the work piece. Subsequently, a chamfer is machined on the work piece in the area of the drill hole rim. By means of the facing plate 3, spot facing can then be carried out at the work piece.

In a simplest embodiment of the combination tool, the grip 2 is provided with only one single chamfering plate 4 or only one single facing plate 3. In the illustrated embodiment, the grip 2 is provided with only one single chamfering plate 4 and two facing plates 3 which may be positioned at the grip diametrically opposite each other or also at any other appropriate angular distance from each other. Since the cutting plates 3, 4 are designed as indexable inserts, they can be turned over when the respectively engaged cutting edge is worn out in order to position a not yet used cutting edge into working position.

Since the facing plate 3 and the chamfering plate 4 are positioned at the grip 2, different working tools 5 can be used with the grip 2.

The working tools 5 can be axially adjusted in the grip 2, or twist drills 5 of different lengths can be inserted so that variably deep borings can be applied to the work piece with the combination tool. Since conventional twist drills 5 can be employed with the combination tool, the changeover to different drill depths can be carried out in a very simple way and, above all, cost-efficiently.

Figure 2:
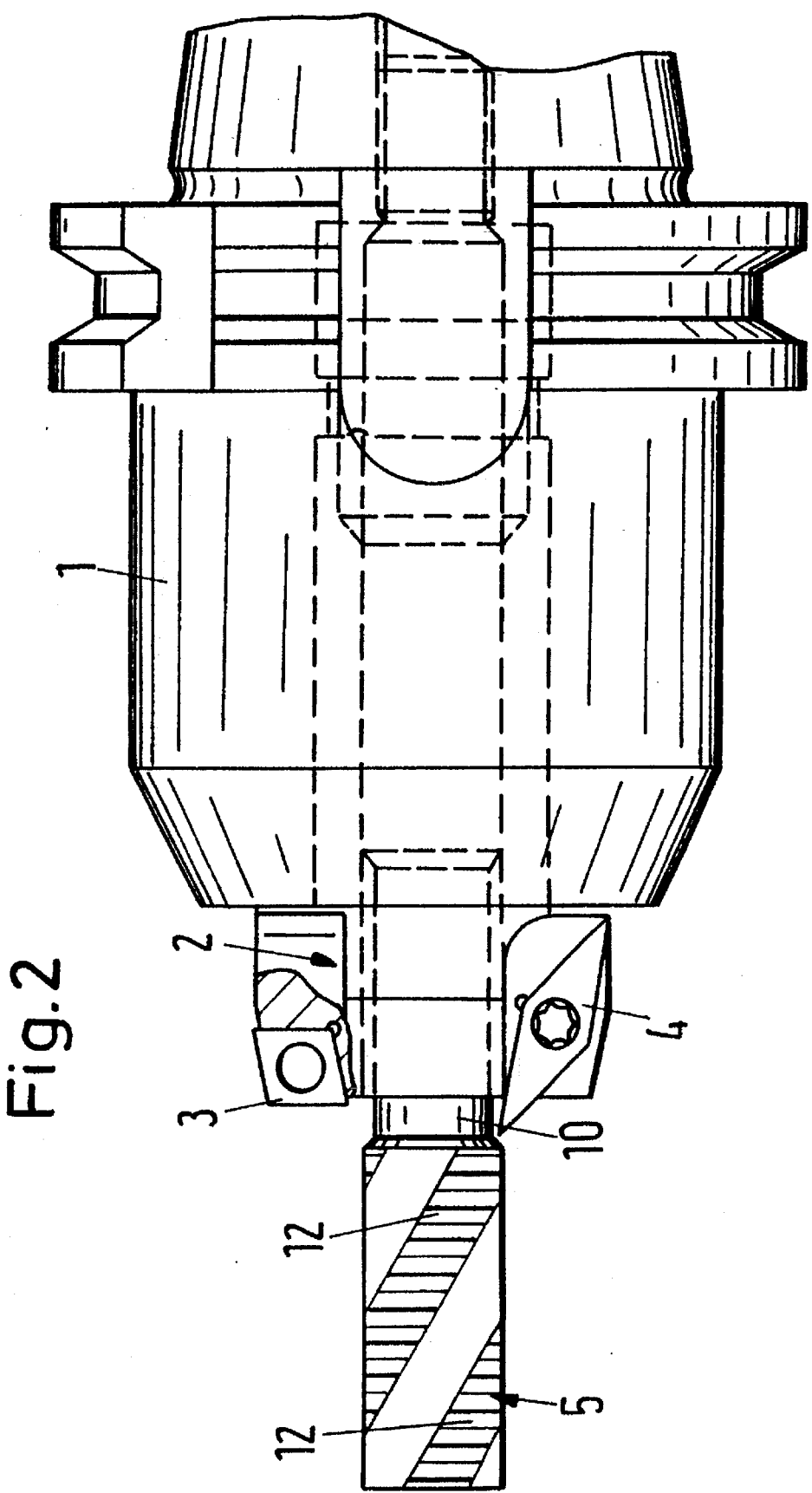

FIG. 2 illustrates the option to insert a tap as a working tool into the grip 2. It is inserted into the grip 2 with its shank 10 and then clamped in the way already described. Taps of different lengths can be used in order to apply threaded bores of different lengths to the work piece.

In the embodiment according to FIG. 3, a tapping tool 5 is clamped with its shank 10 into the grip 2. The tapping tools are provided with circular cutting edges 13, positioned parallel relative to one another which have no thread pitch. The tapping tool 5 has a drill portion 14 at its free end, the drill diameter of which is larger than the one of the adjoining circular cutting edges 13. Moreover, the tapping is provided with spiral chucking grooves 15.

When working with the combination tool according to FIG. 3, first, a drill hole is produced in the work piece with the drill portion 14 of the tapping tool 5. Immediately subsequently, chamfering and spot facing are carried out on the work piece with the cutting plates 3, 4. Since the drill diameter of the drill portion 14 is larger than the diameter of the cutting edges 13, the cutting edges 13 do not come into contact with the walls of the drilled hole. After the drill hole has been machined in the work piece, the rotating tool is radially displaced and rotated such that the cutting edges 13 cut a thread into the drilled wall. During this process, the combination tool is axially displaced by the height of the thread pitch.

Figure 4:
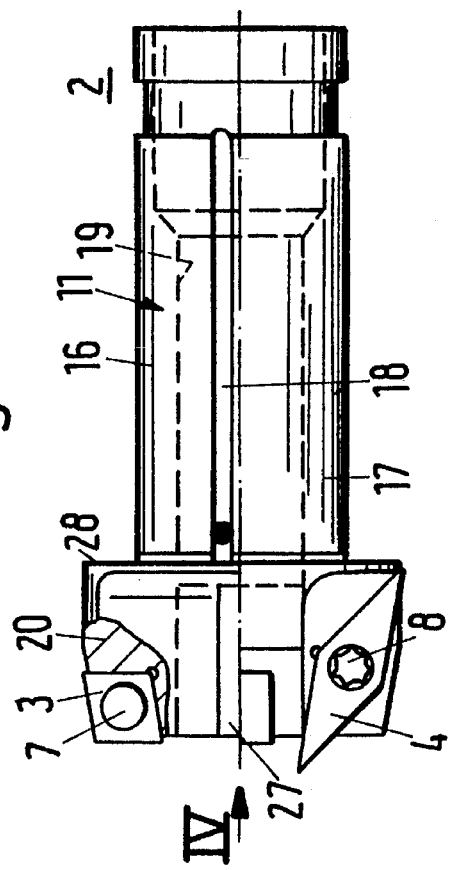
FIG. 4 illustrates a grip of the inventive combination tool.

The grip 2 will be described in detail with the help of FIGS. 4 and 5. The basic design of such a grip is known and is therefore described only in its most essential design. It is provided with a tension sleeve 11 which consists in the illustrated embodiment of four clamping portions 16, 17 (FIG. 4) which are each separated from each other by a slot 18 extending in the axial direction of the tension sleeve 11. The clamping portions 16, 17 are arranged about the circumference of the tension sleeve 11 at preferably the same angular distance relative to one another and limit a receiving opening 19 which receives the shank 10 of the respective working tool 5. The clamping portions 16, 17 are connected to form a unitary part at their end opposite the cutting plates 3, 4.

At their other end, the clamping portions 16, 17 have a transition into clamping elements 20 to 23 which have a wider outer diameter than the clamping portions 16, 17 and are preferably arranged equidistantly in the circumferential direction about the axis of the grip 2. They are each separated from each other by a slot 24 to 27. The clamping elements 20 to 23 also limit the receiving opening 19 for the shank 10 of the working tool 5. The receiving opening 19 advantageously has the same diameter along its entire axial length.

Figure 5:
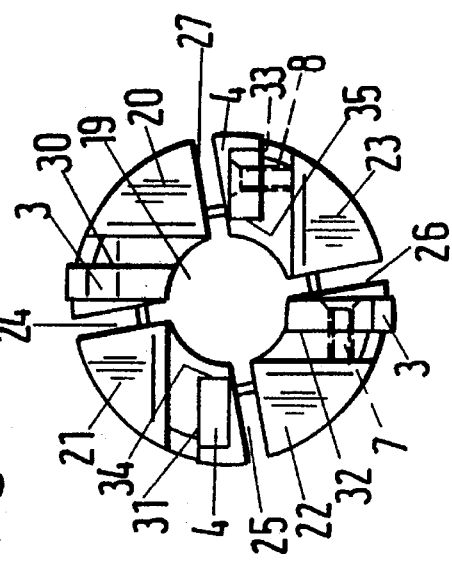
FIG. 5 illustrates a view in the direction of the arrow IV in FIG. 4.

As FIG. 5 illustrates, the grip 2 is provided with two facing plates 3 and two chamfering plates 4 which are respectively positioned diametrically opposite each other. In the circumferential direction of the grip 2, the facing and the chamfering plates 3, 4 are positioned alternately on lateral sides of the clamping elements. The plates each have an angular distance from each other of preferably 90 degrees. Toward the tension sleeve 11, the clamping elements 20 to 23 are provided with a plane bottom side 28 (FIG. 4) forming a radial abutment surface of the grip 2 with which they can abut the plane end face 29 (FIG. 1) of the tool holding fixture 1. Thus, the maximum inserting depth of the grip 2 into the tool holding fixture 1 is defined. Due to the abutment at the end face 29, the tool holding fixture 1 absorbs the axial forces during operation.

For attaching the facing plates 3 and the chamfering plates 4 at the grip 2, the lateral sides of the clamping elements 20 to 23 are provided with receiving portions 30 to 33 (FIG. 5) which open toward the end face of the grip 2 and, if necessary, toward the respective slot 24 to 27. The receiving portions 30 to 33 have plane abutting surfaces for the cutting plates 3, 4. Further abutting surfaces 34 and 35 are provided for the facing plates 3. The parallel plates 3 abut the surfaces 34, 35 with one of their cutting edges. The respective abutting surfaces of the receiving portions 31 and 33 are positioned angularly relative to each other. The clamping elements 20 to 23 are designed such that the screws 7, 8 for attaching the cutting plates are easily accessible with an appropriate screwdriver.

The cutting plates 3, 4 can be designed differently, depending on the desired machining step. A variable number of cutting plates can be attached to the grip 2. It is also possible not to attach any cutting plates at the grip 2 if, for example, only a drilling process should be carried out with the combination tool.

With its shank 10, the respective working tool 5 is inserted into the receiving opening 19 from the end face of the grip 2. Subsequent or prior to this step, the grip 2 itself can be inserted into the hydro-clamping bushing 9 of the tool holding fixture 1. Subsequently, the grip 2 is clamped hydraulically in the receiving member 9 of the tool holding fixture 1 by hydraulic force. The clamping portions 16, 17 of the tension sleeve 11 are pushed radially inwardly whereby the shank 10 of the working tool 5 is tightened.

The working tool 5 can be displaced continuously relative to the grip 2 and then be tightened hydraulically. Thus, the length of the drill hole in the work piece can be easily adjusted.

Figure 7:
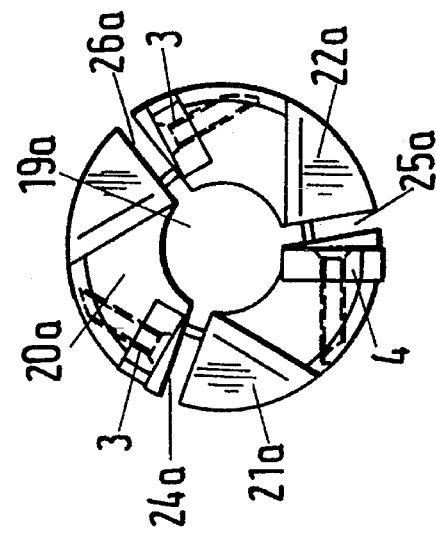
FIG. 6 and FIG. 7 illustrate views according to FIGS. 4 and 5 of a second embodiment of a grip of the inventive combination tool.
Figure 6:
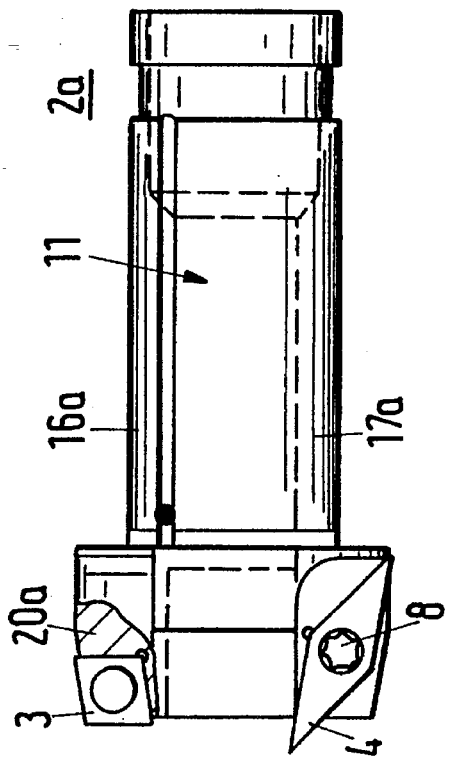

FIGS. 6 and 7 illustrate an embodiment of the grip 2a which provides only three clamping portions 16a, 17a and also, accordingly, only three clamping elements 20a to 22a. The clamping portions 16a, 17a of the tension sleeve 11a, as well as the clamping elements 20a to 22a, again are preferably arranged equi-distantly about the circumference of the grip 2a. The clamping elements 20a to 22a are separated by the slots 24a to 26a. With this embodiment, two facing plates 3 and one chamfering plate 4 are attached to the grip 2a. Otherwise, the grip 2a is designed in the same way as the embodiment according to FIGS. 4 and 5. The working tool 5 is again inserted into the receiving opening 19a of the grip 2a. With its tension sleeve 11a, the grip 2a itself is inserted into the receiving member 9 of the tool holding fixture 1 and is there tightened hydraulically in the described manner. The clamping portions 16a, 17a together with the clamping elements 20a to 22a again are designed as spring elements which are pushed radially inwardly as a function of the hydraulic load within the tool holding fixture 1 and thus tighten the shank 10 of the working tool 5 perfectly.

FIG. 8 illustrates an embodiment in which the grip 2b is inserted into the tool holding fixture 1 such that the tension sleeve 11b is inserted into the hydro-clamping bushing 9 of the tool holding fixture 1.

The tension sleeve 11b is adjacent to a clamping portion 36 which abuts the end face 29 of the tool holding fixture 1 with its plane bottom surface (radial abutment surface) 28b. The clamping portion 36 and the tension sleeve 11b are each provided with an axially and centrally positioned bore hole 37 and 38 for receiving the working tool 5 which is a twist drill in the illustrated embodiment. At least one chamfering element (cutting member) 39 is provided at the clamping portion 36. In the illustrated embodiment, two chamfering elements 39 are provided which are positioned diametrally opposite each other.

Advantageously, the bore holes 37, 38 within the clamping portion 36 and within the tension sleeve 11b have the same diameter so that they can be machined in one operating step.

The twist drill 5 is provided with the shank 10 and an adjoining machining portion 40. Within this machining portion 40, two spiral chucking grooves 41 and 42 are provided extending to the drill tip. A corresponding spiral stays 43, 44 extend between the chucking grooves 41, 42.

The clamping portion 36 is provided with two essentially axially extending transition pieces, positioned approximately diametrically opposite each other and separated from each other in the circumferential direction. These transition pieces 46, 47 extend along a part of the axial length of the clamping portion 36 to its end face. Since the transition pieces 46, 47 are separated from each other, recesses are formed between them which extend from the bore hole 37 to the outer coating surface of the clamping portion 36. During the drilling process, the drill chips which are transported toward the rear via the spiral chucking grooves 41, 42, can exit laterally through these recesses.

Within the clamping portion 36, two chamfering elements 39 are provided which are supported in receiving portions 48 and 49 of the clamping portion 36. The axes of the receiving portions 48, 49 which are positioned diametrally opposite each other converge in the direction of the end face to the clamping portion 36. The receiving portions 48, 49 penetrate the transition pieces 46, 47 and partly open into their end faces. At one side, the receiving portions 48, 49 are bordered by clamping legs which are tightened toward the transition pieces 46, 47 by clamping screws 50, 51. The receiving members 48, 49 are provided within the transition pieces 46, 47 such that the chamfering elements 39 slightly project past these receiving portions 48, 49 in the direction of the clamping legs. On tightening these clamping screws, the clamping legs tightly abut the chamfering elements 39 which are thus securely tightened within the receiving portions 48, 49. Within the receiving portions 48, 49, the chamfering elements 39 are rotationally fixed. This is achieved by the corresponding cross-sectional designs of the chamfering elements 39 and the receiving portions 48, 49.

With its shank 10, the working tool 5 is inserted into the grip 2b. From the outside, the chamfering elements 39 are inserted into the receiving portions 48, 49 that far that they abut the rear surface of the respective stay 43, 44 of the working tool 5. Then, the clamping legs with the clamping screws 50, 51 are tightened toward the chamfering elements 39 such that they are clamped tightly.

In order to be able to drill a drill hole of a different length, the working tool 5 can be adjusted axially relative to the grip 2b after loosening the hydraulic force.

First, an appropriate drill hole is machined in the work piece with the working tool 5. On drilling further, the chamfering elements 39 engage the drill hole rim and create a corresponding chamfer at it. For this purpose, the chamfering elements 39 are positioned at such an angle relative to the axis of the working tool 5 that they axially project past the clamping portion 36 with their cutting edges. If the chamfering elements 39 need to be adjusted in their longitudinal direction, it is simply necessary to loosen the clamping screws 50, 51. Then, the chamfering elements 39 can be adjusted to the desired position in order to abut the twist drills 5 when drill bits of different diameters are used. Since the elastic clamping legs are attached to the clamping portion 36, they do not have to be mounted on it separately.

It is also possible, not to clamp the chamfering elements 39 with elastic clamping legs but to attach them directly to the transitions pieces 46, 47. In order to provide the possibility to adjust the chamfering elements 39 lengthwise, they can be attached to a sliding member displaceably supported on the transition pieces 46, 47. In this case, the sliding member itself is tightened with clamping screws in its respective adjusting position.

With each of the described embodiments, simple working tools 5 can be inserted, since the cutting plates 3, 4, 39 are positioned at the grip 2, 2a, 2b. Thus, conventional tools 5 can be used which can be inserted easily into the grip. Also, tools of different length can be inserted into the grip. Therefore, the user of this combination tool needs to have only one grip for a large number of different tools. The initial costs and the stock-keeping costs can therefore be kept at a very low level.

Figure 9:
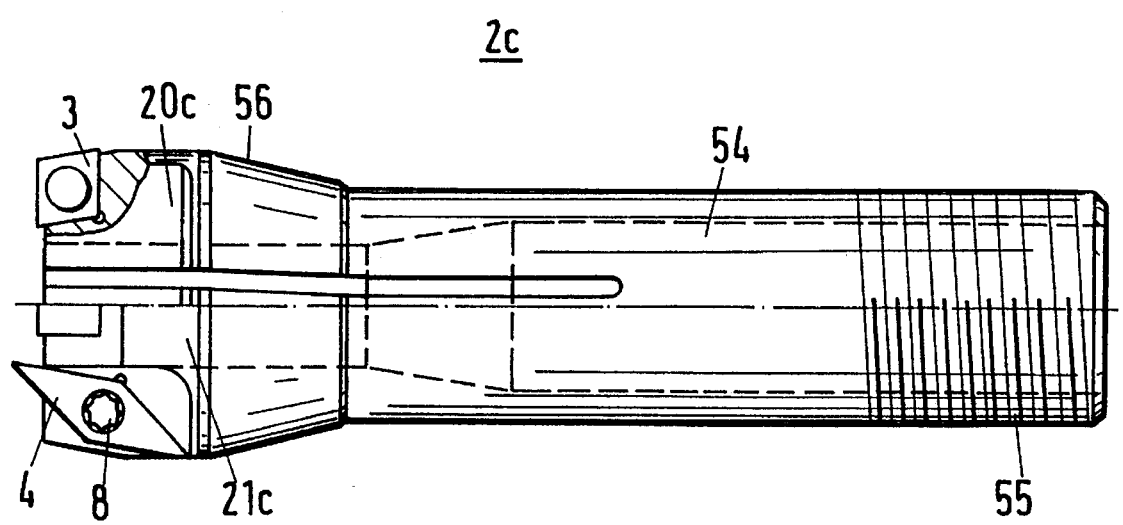
FIG. 9 illustrates a side view of a further embodiment of a grip of an inventive combination tool.

With each of the embodiments, it is possible to clamp the grip within the tool holding fixture with the help of draw-in collets. Instead of a tension sleeve, the grip 2c, as FIG. 9 illustrates as an example, is provided, for example, with draw-in collet 54 having four slots, preferably formed as one piece, having a thread 55 at its free end. By means of this thread 55, the grip 2c is screwed into the tool holding fixture (which is not illustrated). The tool holding fixture provides a conical surface which cooperates with a conical surface 56 of the grip 2c. By this means, the clamping elements 20c, 21c of the grip 2c are pushed radially inwardly and tighten the shank 10 of the tool 5. The tool holding fixture is connected to the driving spindle of the machine tool in a known manner. Since the design and operation of a draw-in collet are known, they are not described in detail.

The present invention is, of course, in no way restricted to the specific disclosure of the specification and drawings, but also encompasses any modifications within the scope of the appended claims.

What we claim is:

1. A combination tool comprising:

a tool holding fixture for connecting said combination tool to a drive spindle of a machine tool;

said tool holding fixture comprising an axially extending receiving member;

a grip with a tension sleeve, said grip received in said receiving member of said tool holding fixture, said receiving member clamping said tension sleeve;

said tension sleeve of said grip having an axially extending receiving opening for receiving a shank of a working tool;

said tension sleeve comprising elastic clamping portions being pushed radially inwardly by said receiving member for clamping the shank of the working tool in said receiving opening;

said grip having an end facing away from said tool holding fixture;

said grip comprising clamping elements distributed at a distance from one another in a circumferential direction of said grip at said end facing away from said tool holding fixture; and at least one cutting member connected to an end face of said end of said grip.

2. A combination tool according to claim 1, wherein each one of said cutting members is connected to a separate one of said clamping elements.

3. A combination tool according to claim 2, wherein said clamping elements each have a lateral surface facing a neighboring one of said clamping elements and wherein said cutting members are connected to said lateral surface.

4. A combination tool according to claim 3, wherein said lateral surface comprises a receiving element for said cutting member.

5. A combination tool according to claim 1, wherein said grip comprises at least one receiving portion for said at least one cutting member, said at least one receiving portion extending slanted to an axis of the working tool.

6. A combination tool according to claim 5, further comprising a clamping leg for clamping said at least one cutting member in said receiving portion.

7. A combination tool according to claim 1, wherein the working tool is continuously axially displaceable and adjustable relative to said at least one cutting member.

8. A combination tool according to claim 1, wherein said tensioning sleeve hydraulically clamps said grip in said tool holding device.

9. A combination tool according to claim 1, further comprising a draw-in collet for clamping the working tool in said grip.

10. A combination tool according to claim 1, wherein only one of said cutting members is provided and connected to one of said clamping elements.

11. A combination tool according to claim 10, wherein said one clamping element has a lateral surface facing a neighboring one of said clamping elements and wherein said cutting member is connected to said lateral surface.

12. A combination tool according to claim 11, wherein said lateral surface comprises a receiving element for said cutting member.

13. A combination tool comprising:

a tool holding fixture for connecting said combination tool to a drive spindle of a machine tool;

said tool holding fixture comprising a receiving member;

a grip with a tension sleeve, said grip received in said receiving member of said tool holding fixture, said receiving member clamping said tension sleeve;

said grip having a receiving element for receiving a shank of a working tool and an end face facing away from said holding fixture;

at least one cutting member connected to said end face of said grip; and said grip having a radial abutment surface for resting at an end face of said tool holding fixture.

* * * * *